United States Patent
Brost et al.

(10) Patent No.: US 9,911,039 B1
(45) Date of Patent: Mar. 6, 2018

(54) SEARCHES OVER GRAPHS REPRESENTING GEOSPATIAL-TEMPORAL REMOTE SENSING DATA

(71) Applicant: National Technology & Engineering Solutions of Sandia, LLC, Albuquerque, NM (US)

(72) Inventors: Randolph Brost, Albuquerque, NM (US); David Nikolaus Perkins, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 14/848,169

(22) Filed: Sep. 8, 2015

(51) Int. Cl.
*G06K 9/00* (2006.01)
*G06K 9/46* (2006.01)
*G06K 9/62* (2006.01)
*G06T 7/00* (2017.01)

(52) U.S. Cl.
CPC ......... *G06K 9/00637* (2013.01); *G06K 9/469* (2013.01); *G06K 9/6267* (2013.01); *G06T 7/004* (2013.01)

(58) Field of Classification Search
CPC .. G06K 9/00637; G06K 9/469; G06K 9/6267; G06T 7/004
See application file for complete search history.

(56) References Cited

U.S. PATENT DOCUMENTS

| | | | | |
|---|---|---|---|---|
| 7,711,146 | B2 * | 5/2010 | Tu | G06K 9/00295 348/143 |
| 9,251,277 | B2 * | 2/2016 | Hampapur | G06F 17/3087 |
| 9,256,689 | B2 * | 2/2016 | Hampapur | G06F 17/3087 |
| 2005/0265582 | A1 * | 12/2005 | Buehler | G06K 9/00335 382/103 |
| 2010/0046842 | A1 * | 2/2010 | Conwell | G06F 17/30265 382/218 |
| 2013/0063489 | A1 * | 3/2013 | Hourie | G06F 17/30241 345/643 |
| 2014/0279927 | A1 * | 9/2014 | Constantinescu | G06F 17/30156 707/679 |

OTHER PUBLICATIONS

Shyu, Chi-Ren, et al. "GeoIRIS: Geospatial information retrieval and indexing system—Content mining, semantics modeling, and complex queries." IEEE Transactions on geoscience and remote sensing 45.4 (2007): 839-852.*

(Continued)

*Primary Examiner* — Jonathan S Lee
(74) *Attorney, Agent, or Firm* — Medley, Behrens & Lewis, LLC

(57) ABSTRACT

Various technologies pertaining to identifying objects of interest in remote sensing images by searching over geospatial-temporal graph representations are described herein. Graphs are constructed by representing objects in remote sensing images as nodes, and connecting nodes with undirected edges representing either distance or adjacency relationships between objects and directed edges representing changes in time. Geospatial-temporal graph searches are made computationally efficient by taking advantage of characteristics of geospatial-temporal data in remote sensing images through the application of various graph search techniques.

20 Claims, 10 Drawing Sheets

(56) References Cited

OTHER PUBLICATIONS

Brost, Randolph C., et al. Temporal Analysis and Change Detection via Geospatial-Temporal Semantic Graphs. No. SAND2014-1361C. Sandia National Laboratories (SNL-NM), Albuquerque, NM (United States), 2014.*

Liu, Xiaobai, et al. "Trajectory parsing by cluster sampling in spatio-temporal graph." Computer Vision and Pattern Recognition, 2009. CVPR 2009. IEEE Conference on. IEEE, 2009.*

Brost, et al., "A Computational Framework for Ontologically Storing and Analyzing Very Large Overhead Image Sets", In 3rd ACM SIGSPATIAL International Workshop on Analytics for Big Geospatial Data (BigSpatial), 2014, pp. 1-10.

Fekete, et al., "Geometric Hitting Set for Segments of Few Orientations", In Approximation and Online Algorithms, Springer International Publishing, 2015, pp. 1-2.

Ray, et al., "Jackpine: A Benchmark to Evaluate Spatial Database Performance", In Data Engineering (ICDE), 2011 IEEE 27th International Conference on IEEE, 2011, 12 pages.

Doan, et al., "Learning to Map Between Ontologies on the Semantic Web", In Proceedings of the 11th International Conference on World Wide Web, ACM, May 7, 2002, 12 pages.

Passino, et al., "Aspect Coherence for Graph-Based Semantic Image Labelling", May 25, 2009, 29 pages.

Strip, David, "Source Agnostic Fusion Through Geospatial/Temporal Semantic Graphs", Sep. 26, 2012, 26 pages.

Brost, et al., "Geospatial-Temporal Remote Sensing Analysis Using Semantic Graphs", Project No. SL12-DeltaSpaceTime-PD06, Jan. 16, 2013, 1 page.

Watson, et al., "Verification, Monitoring, and Remote Detection (VMRD2012) Joint Program Review Meeting", In Sandia Unclassified Unlimited Release, May 15, 2012, 31 pages.

Brost, Randy C., "A Computational Framework for Ontologically Storing and Analyzing Very Large Overhead Image Sets", In Sandia Unclassified Unlimited Release UUR SAND 2014-19280C, Nov. 4, 2014, 86 pages.

Brost, et al., "Thoughts on Multi-Modality Data Analysis", In Sandia Unclassified Unlimited Release UUR SAND 2015-1124C, Mar. 2, 2015, 10 pages.

Brost, Randy C., "Nuclear Weaponization and Material Production Detection Review Meeting", In Sandia Unclassified Unlimited Release UUR SAND 2014-2656C, Apr. 29, 2014, 44 pages.

Brost, et al., "Computing Quality Scores and Uncertainty for Approximate Pattern Matching in Geospatial Semantic Graphs", In Sandia Power Point Presentation at Conference on Data Analysis, SAND 2014-1753P, 2014, 1 page.

Brost, Randy C., "Geospatial-Temporal Semantic Graphs for Remote Sensing Data Analysis", In Sandia Unclassified Unlimited Release UUR SAND 2015-5935 PE, Jul. 23, 2015, 78 pages.

Brost, et al., "LDRD Final Report: First Application of Geospatial Semantic Graphs to SAR Image Data", In Sandia Report SAND2013-0724, Jan. 2013, 65 pages.

Brost, et al., "Image-Based Algorithms—Semantic Graph Algorithms", In Sandia Unclassified Unlimited Release UUR SAND 2015-2228C, Apr. 29, 2015, 1 page.

"Pattern Analytics to Support High-Performance Exploitation and Reasoning", In Sandia Power Point on Laboratory Directed Research and Development Data-to-Decision Grand Challenge, SAND 2013-3298A, Apr. 25, 2013, 3 pages.

Brost, et al., "Approximate Pattern Matching Under Uncertainty in Geospatial Semantic Graphs", In Sandia Power Point on PANTHER DA Uncertainty, Mar. 7, 2014, 35 pages.

Watson, et al., Encoding and Analyzing Aerial Imagery Using Geospatial Semantic Graphs, In Sandia Report SAND2014-1405, Feb. 2014, 30 pages.

* cited by examiner

SEARCHES OVER GRAPHS REPRESENTING GEOSPATIAL-TEMPORAL REMOTE SENSING DATA

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Remote sensing data, including high-resolution imagery from aircraft and spacecraft-based surveillance and imaging systems, is now being used for purposes ranging from meteorological observation to military surveillance. Large remote sensing datasets are being collected that represent information about large geographical regions with many different features of interest. Current machine-assisted search techniques primarily rely on defining searches over particular image pixel characteristics to identify these features within a larger dataset. These techniques often fail to capture semantically relevant patterns in the data, especially over time.

SUMMARY

The following is a brief summary of subject matter that is described in greater detail herein. This summary is not intended to be limiting as to the scope of the claims.

Various technologies for locating features of interest within large remote sensing datasets by searching over a geospatial-temporal (GST) graph are described herein. In an example, a computing system is used to generate graph representations of the geospatial and temporal relationships of objects depicted in remote sensing data of a scene. In the graph, nodes can represent various features present in the remote sensing data, for example buildings, roads, bodies of water, vehicles, etc., and can be encoded with information describing when in time the features appeared in the remote sensing dataset. The relationships between nodes in the graph are described by graph edges which are either undirected or directed edges. Geospatial relationships between features, e.g., distance, are represented by undirected edges while temporal relationships that describe change over time are represented by directed edges.

Such a GST graph can be used to quickly and efficiently search for features of interest in a remote sensing dataset, for example the presence of a certain type of building or an area of change over time. GST graphs of large remote sensing datasets may be computationally expensive to search using methods such as subgraph isomorphism, and can exhibit certain relational characteristics as a result of remote sensing data limitations that inhibit direct identification of features of interest. As a result of features common to GST graphs of remote sensing data, search techniques such as star graph search, heterogeneous complex search, reintegration of interrupted signatures, amongst others are able to simplify the search problem for GST graphs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
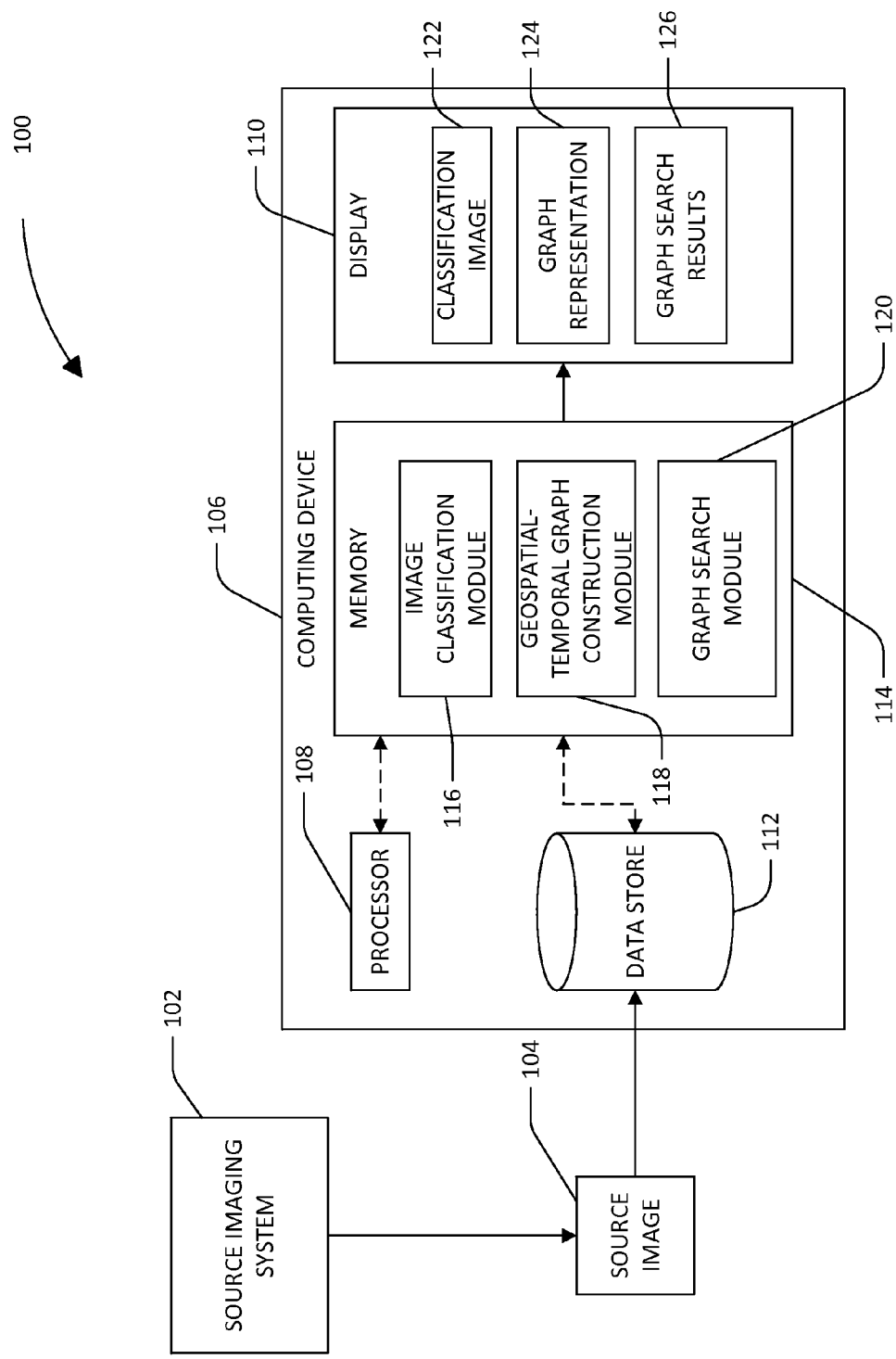
FIG. 1 is a functional block diagram of an exemplary system that facilitates generating GST graphs from remote sensing data and searching the GST graphs for geospatial or temporal features of interest.

Various technologies pertaining to searching GST graphs to identify features of interest in a source remote sensing data image are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component, module or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates generating GST graphs of remote sensing data images and searching the graphs for objects of interest is illustrated. The system 100 includes a source imaging system 102 that generates source images 104 and a computing device 106 that generates graph representations of the source images 104 and performs searches over these graphs to find objects of interest in the images. The source imaging system 102 can be any system that is capable of generating a source image from remote sensing data. In an example, the source imaging system 102 can be an aircraft-mounted synthetic aperture radar (SAR) imaging system. In another example, the source imaging system 102 can be an imaging system that captures RGB+IR images. The computing device 106 comprises a processor 108, a display 110, a data store 112, and memory 114 comprising instructions that are executed by the processor 108.

The memory 114 comprises an image classification module 116, a GST graph construction module 118, and a graph search module 120. The image classification module 116 receives a source image 104 from the data store 112 and, when executed by the processor 108, conducts pre-processing operations to classify regions of the scene depicted in the source image 104 into one of several categories, e.g., structures, vegetation, etc., as described in greater detail below with respect to FIG. 2. The image classification module 116 can then cause a classification image 122 to be presented on a display 112 for user analysis and review. The classification image 122 can include pointers back to the original source image 104, and a user can take advantage of these pointers to refer back to the source image 104 to confirm that regions of the image are classified appropriately.

The GST graph construction module 118 then creates a GST graph representation of adjacency, distance, or temporal relationships of the objects depicted in the scene from the classification images 122 that were generated by the image classification module 116. Distance and adjacency relationships refer to the relative geospatial position of objects as observed in the source images 104 of the scene. Temporal relationships refer to how objects depicted in the scene are observed to change from one time to another or to move, disappear, or reappear in the case of movable objects like vehicles. In the GST graph, classified objects are represented by nodes, distance or adjacency relationships between objects are represented by undirected edges, and temporal relationships are represented by directed edges. Additional directed or undirected edges may also be present. Generally, an undirected edge between nodes can be representative of any suitable symmetric relationship between objects represented by the nodes, and a directed edge between nodes can be representative of any suitable asymmetric relationship between objects represented by the nodes.

The GST graph construction module 118 further encodes nodes with various data about the regions that they represent, for example ground cover category, size, centroid, etc. In an embodiment, the GST graph construction module 118 can construct a stored graph representing remote sensing data of a wide area through an iterative process wherein graph representations of subsets of the data are constructed and then added to the stored graph. The GST graph construction module 118 can cause a graph representation 124 to be presented on the display 110 for user examination and review, wherein the graph representation 124 may be a pictorial graph, a text-based presentation of the nodes and their associated edges, etc. A GST graph can also include pointers to the source data, whether the data be a classification image 122 or a source image 104, linking the graph nodes to the objects that they represent in the images. The GST graph construction module 118 can receive a variety of different types of input data and use such input data when constructing the GST graph. Exemplary types of input data include images, point data, track data, data from databases, and so forth.

The graph search module 120 conducts user-defined searches for particular features of interest over GST graphs generated by the GST graph construction module 118. In an embodiment, responsive to receiving a graph search query from a user, the graph search module 120 generates a search graph derived from the larger stored graph based on the parameters of the query. In the exemplary embodiment, the search graph is constructed based at least in part on node attributes defined in the user query. For example, if a search query asks for all structures with nearby paved parking lots, the graph search module 120 can construct a search graph of the larger stored graph that does not include grass, tree, or other nodes that do not correspond to structure or pavement. Generating the intermediate search graph prior to examining a graph for matches saves query processing time by narrowing the search space based upon readily-evaluated criteria, e.g. node type. This approach of generating the intermediate search graph prior to examining a graph for matches also enables certain node transformation operations such as erode/dilate shape morphological operations, and further enables use of pointers back to the original source image data to lookup details lost in the image classification phase, such as specific height values, ground surface colors, etc. The search graph also comprises a subset of the edges of the larger stored graph, where the edges included satisfy maximum distance limits and other constraints specified by the search template. These additional constraints may include spatial relationships, temporal relationships, and/or semantic relationships.

The graph search module 120 can then apply various search techniques to the search graph based upon the search query defined by the user. Certain exemplary search techniques that can be employed by the graph search module 120 are described in detail below in relation to FIGS. 6-8. Results of the search can then be presented to a user as graph search results 126 on a display 110. In an example, the graph search results 126 can be a pictorial or text representation of a graph signature matching the search criteria. In another example, the graph search results 126 may be a pictorial representation of a matching graph signature overlaid on a source image 104 by taking advantage of pointers back to source data that can be included in a graph structure.

Figure 2:
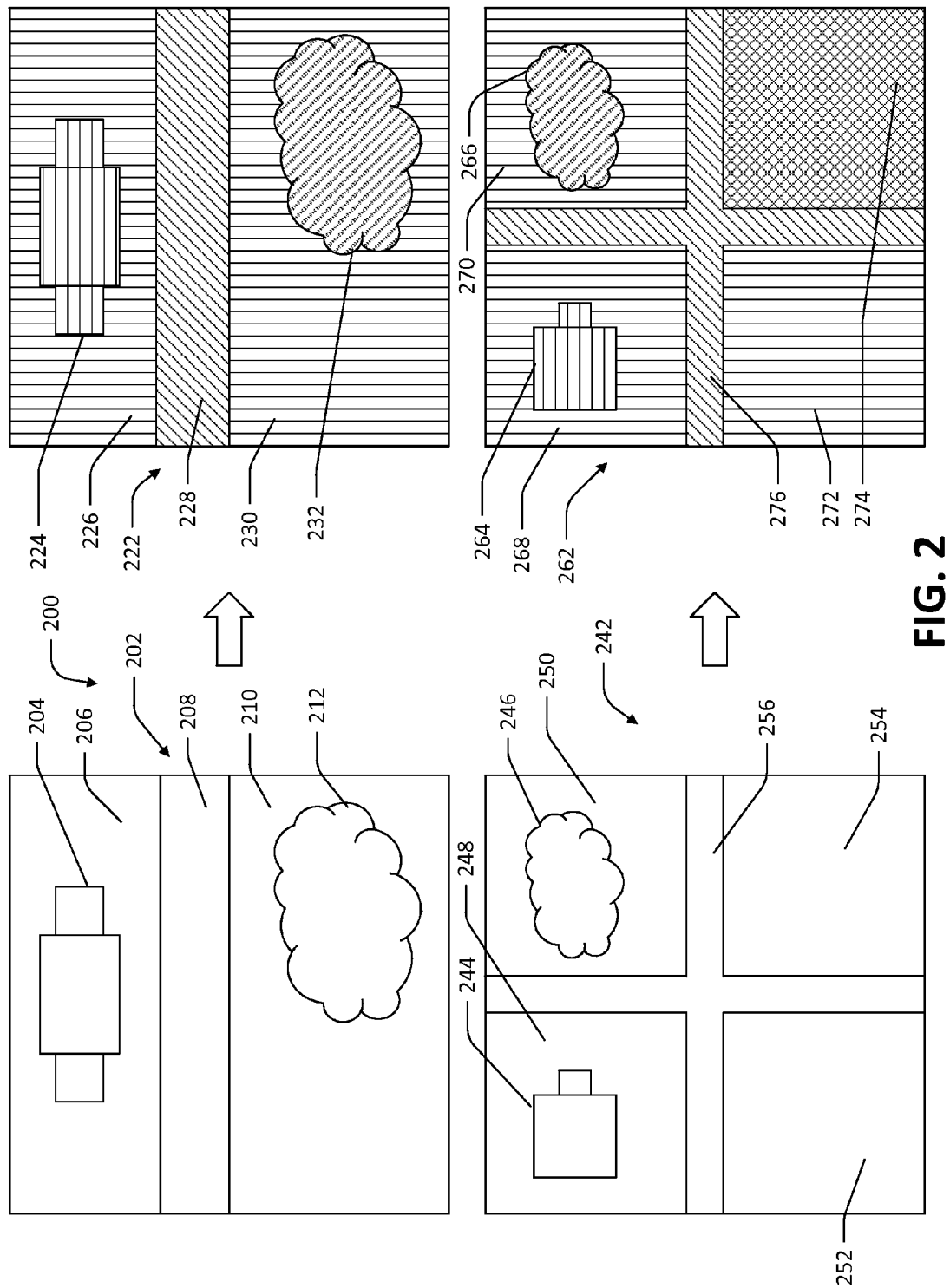
FIG. 2 is an example illustration of classification images generated from a remote sensing image dataset.

Referring now to FIG. 2, an exemplary illustration 200 of the creation of classification images 222 and 262 from source images 202 and 242 is presented. As described above with respect to FIG. 1, the image classification module 116 generates a classification image 122 as output from an input source image 104 comprising remote sensing data of a scene. In an example, the image classification module 116 can assign different colors to different portions of a classification image, the colors corresponding to the type of object depicted in the input source image 104. The input source image 104 may be one or several images comprising data that may be used to generate a suitable classification image of the scene. In an example, the source image 104 includes RGB+IR imagery, LiDAR, and GIS road data to provide a detailed model of land cover of the scene that is capable of distinguishing between buildings, trees, low vegetation such as grass and shrubs, roads, other pavement, bare earth, and water. In the example, LiDAR data can be used by the image classification module 116 to construct a normalized digital surface model (nDSM) of the scene showing elevation of objects in the scene above ground. The image classification module 116 can then categorize objects in the scene as either "tall" or not based on their elevation above ground, where tall refers to objects the size of trees or buildings (e.g., 2 meters or more above ground). Among tall objects, the image classification module 116 can differentiate between trees and buildings using a normalized difference vegetation index (NDVI) computed from the RGB+IR image. Among the "short" objects, low vegetation can also be identified using the NDVI. Remaining objects, such as dirt, pavement, and water may be differentiated based on spectral, geometric, and other contextual properties. Among the set of objects classified as pavement, roads can be distinguished using GIS road data. While the example classification process described above provides one approach to generating classification images, it is to be understood that any other input imaging data, for example SAR data, may be used to generate classification images using any image processing methods capable of distinguishing among different object types at a high level.

Illustrating the results of the procedure described above, in FIG. 2 two input images 202 and 242 are shown along with their corresponding classification images 222 and 262. The first input image 202 of a first scene comprises a building 204 surrounded by a first grass field 206, a road 208, and a second grass field 210 surrounding a tree 212. The corresponding first classification image 222 depicts the same scene wherein different regions are shaded according to their classification. In an example, the shading of different regions in the classification image 222 may comprise displaying the different regions in different colors to facilitate human analysis. The shaded region 224 corresponding to the building 204, the region 228 corresponding to the road 208, and the region 232 corresponding to the tree 212 are each shown with different shading according to their classifications as structures, road pavement, and tall vegetation, respectively. The region 226 corresponding to the first grassy field 206 and the region 230 corresponding to the second grassy field 210 are depicted with the same additional type of shading, indicating that they both belong to the low vegetation classification.

Referring still to FIG. 2, the second input image 242 depicts a scene comprising a house 244, a tree 246, a first grassy field 248, a second grassy field 250, a third grassy field 252, a first dirt field 254, and a road 256. The corresponding second classification image 262 likewise depicts the same scene with regions shaded according to their classification. The region 264 corresponding to the house 244, the region 266 corresponding to the tree 246, and the region 276 corresponding to the road 256 are shaded differently according to their classifications. The regions 268, 270, and 272 corresponding to the three grassy fields 248, 250, and 252 have the same additional type of shading. The region 274 corresponding to the dirt field 254 has yet another type of shading because, although it represents an open field, the image classification module 116 in the example embodiment is capable of distinguishing between grass and dirt.

Figure 3:
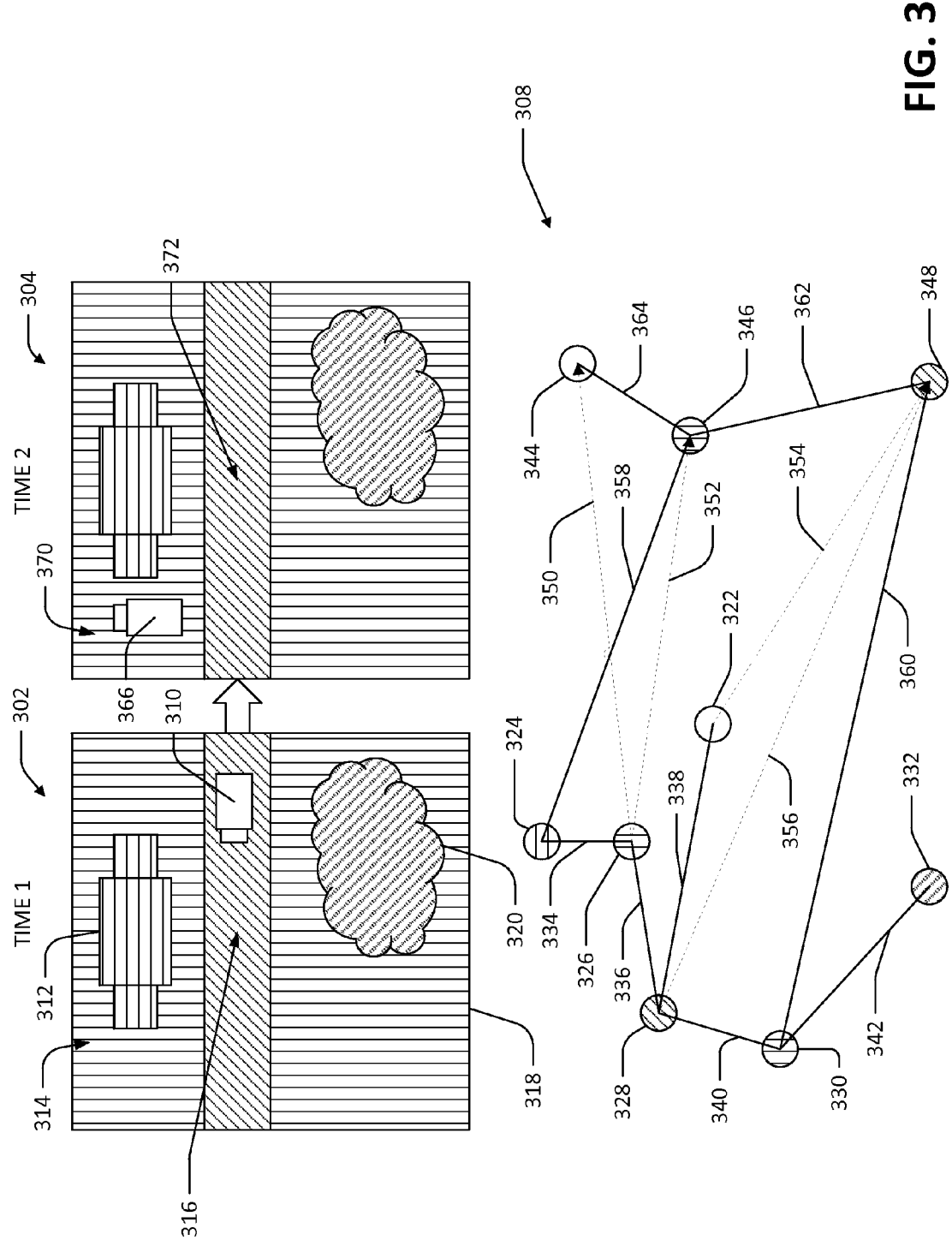
FIG. 3 is an example illustration of a GST graph generated from classification images of a scene.

FIG. 3 illustrates a series of classification images 302-304 in which a truck 310 is shown over a period of two observations, and a GST graph representation 308 incorporating the truck sightings as additional nodes. In this activity graph representation, nodes have an additional attribute signifying whether they are durable or ephemeral, e.g., labels that are indicative of whether objects represented by the nodes are expected to change. Ephemeral nodes may correspond to transient natural objects such as clouds, or be indicators of activity such as vehicles or tracks. Ephemeral nodes are further distinguished by the different encoding scheme used to define their time attribute. Since ephemeral nodes are not expected to persist through time like durable nodes are, they are associated with a chronology $[t_{min}, t_{max}]$ describing the range of time when the ephemeral object may have appeared.

Referring again to FIG. 3, the first classification image 302 depicts a truck 310 on a roadway 316 near a structure 312, two grass fields 314, 318, and a tree 320. The objects in the image 302 are represented by nodes 322-332 respectively corresponding to the truck 310, the structure 312, the upper grass field 314, the roadway 316, the lower grass field 318, and the tree 320. The undirected edges 334-342 connecting the nodes 322-332 represent the adjacency relationships between the corresponding objects 310-320 in the first classification image 302. The node corresponding to the truck 322 is encoded as an ephemeral node, while the remaining nodes 324-332 are encoded as durable.

Information from the second classification image 304 is then incorporated into the GST graph 308 by adding three nodes 344-348, four directed edges 350-356 representing the changes from the first image 302 to the second image 304, and four undirected edges 358-364 representing adjacency relationships in the second image 304. The activity of the truck 310 has caused a change in the classification of parts of the images from time 1 to time 2. The region of the grass field 314 has now become in the second classification image 304 a vehicle region 366 and a grass field region 370, represented by nodes 344 and 346 respectively. This change through time is represented by the directed edges 350 and 352 linking node 326 at time 1 to nodes 344 and 346 at time 2. Likewise, the region occupied by the truck 310 and the road 316 at time 1 is now occupied solely by the road 372, and the directed edges 354 and 356 represent the change from nodes 322 and 328 at time 1 to node 348 at time 2.

Designating nodes 322 and 344 with the ephemeral attribute allows analysis of activity objects in the images 302 and 304 by examining the graph structure rather than the images directly. This generally allows for faster machine-assisted search of large image datasets for potential signs of activity than analysis of image pixel data. In an example, an analyst can define a search over a large graph seeking information about the activity of all vehicles near buildings. A graph search algorithm can then examine the graph 308 as a subgraph of a much larger dataset, identify the two ephemeral nodes 322 and 344 corresponding to vehicles near buildings, and determine possible paths taken by the candidate vehicle from time 1 to time 2 by analyzing the adjacency and temporal edges linking vehicles to buildings. Ordinarily, of course, an analyst will not know ahead of time what happened to an object of interest through a series of images separated in time. In FIG. 3, for example, the truck 310 observed at time 1 may not be the same truck as the one 366 observed at time 2. If a search over the GST graph reveals that the truck 310 could not have reached the position of the truck 366 in the period between time 1 and time 2, then the search algorithm could determine automatically that the two trucks were not the same without requiring further input from the analyst. Using the GST information encoded in the graph structure, the ephemeral node attribute of activity candidates, and the associated chronology [$t_{min}$, $t_{max}$] of candidate nodes, an algorithm could rule out impossible or improbable activity patterns, such as a vehicle exceeding its top speed to reach the observed point along a particular path or driving through impassable terrain. These activity-based searches can also be used to generate an activity representation that can be presented to an analyst on a display 110 for further assessment as graph search results 126, allowing GST graph representations of activity to augment rather than replace a human's judgment.

Figure 4:
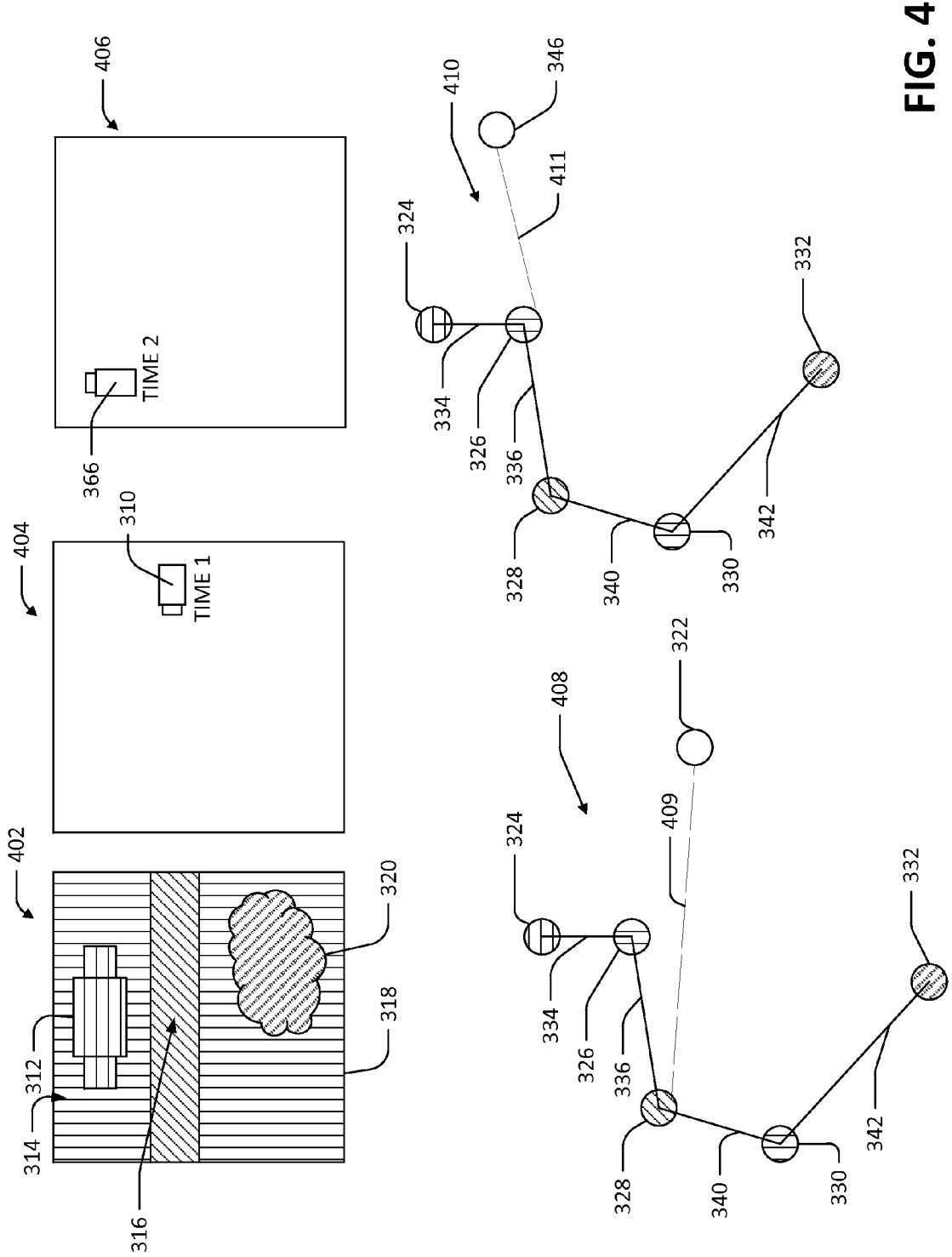
FIG. 4 illustrates another exemplary embodiment for constructing a GST graph.

With reference now to FIG. 4, another exemplary embodiment pertaining to constructing a GST graph is illustrated, where the GST graph is constructed in layers. FIG. 4 depicts images 402, 404, and 406 that are derived based upon the images 302 and 304 set forth in FIG. 3. With more particularity, the image classification module 116 can receive the images 302 and 304, and output the images 402, 404, and 406 based upon the images 302 and 304. The first image 402 represents a background of the scene, where the classification module 116 extracts objects from the images 302 and 304 not found in both images (e.g., the truck(s) 310 and 366) of the scene. The second image 404 illustrates position of a truck 310 at time 1 (when the image 302 was captured), and the third image 406 illustrates position of a truck at time 2 (when the image 304 was captured). Or, images 404, 406 may arrive from separate sources which capture the truck locations at time 1 and time 2. In this embodiment, the GST construction module 118 can generate a GST graph in layers, where a first layer 408 is formed based upon the images 402 and 404, and a second layer 410 is formed based upon the images 402 and 406. The GST construction module 118 can then merge the layers to form a GST graph 500 (shown in FIG. 5).

With more particularity, the GST construction module 118 can construct a first layer 408 based upon the images 402 and 404, where the first layer 408 comprises the nodes 324-332 and undirected adjacency edges 334, 336, 340, and 342, which have been described above. The geospatial graph may also include undirected distance edges, which encode distance between non-adjacent objects in the scene. For example, the graph may include an undirected edge between the node 326 and the node 332, where the undirected edge is assigned data that is indicative of distance between the upper grass field 314 and the tree 320. This distance, for example, may represent a closest distance between the upper grass field 314 and the tree 320, a distance between centroids of the upper grass field 314 and the tree 320, a furthest distance between the upper grass field 314 and the tree 314, a median distance between the upper grass field 314 and the tree 320, any other suitable distance metric, or some combination thereof.

The GST construction module 118 may then supplement the first layer 408 with nodes that represent activity objects that appear in the first image 302 (e.g., the truck 310 illustrated in image 404). Continuing with this example, the GST construction module 118 can construct the node 322, which is representative of the truck 310 at time 1. The GST construction module 118 can also construct an undirected edge 409 between the node 322 and the node 328, where the undirected edge 409 is assigned values that are indicative of a distance between the truck 310 and the roadway 316, as well as an amount of overlap between the truck 310 and the roadway 316. As described previously, the GST construction module 118 can construct additional undirected edges between the node 322 and other nodes in the first layer 408, where such edges are assigned values indicative of distance and/or overlap between the truck 310 and other objects in the scene. Because the node 322 represents an object that does not appear across all images of the scene, the GST construction module 118 can assign a label to the node 322 in the first layer 408 that indicates that the node 322 potentially represents an activity object.

The GST construction module 118 can subsequently construct a second layer 410 based upon the image 402 and the image 406. For purposes of explanation, the second layer 410 is illustrated as including the nodes 324-332 and the edges 334, 336, 340, and 342 corresponding thereto; it is to be understood, however, that for sake of computing efficiency the second layer 410 may include only nodes that are not included in the first layer 408. The GST construction module 118 constructs the node 346, which is representative of the truck 366 in the third image 406, and further constructs an undirected edge 411 between the node 346 and the node 326. The GST construction module 118 assigns the undirected edge 411 values that are indicative of distance between the truck 366 and the upper grass field 314 and overlap between the truck 366 and the upper grass field 314. Further, the GST construction module 118 can construct additional undirected edges between the node 346 and other nodes in the second layer 410, where such edges are assigned values indicative of distance and overlap between the truck 366 and other objects in the scene.

Figure 5:
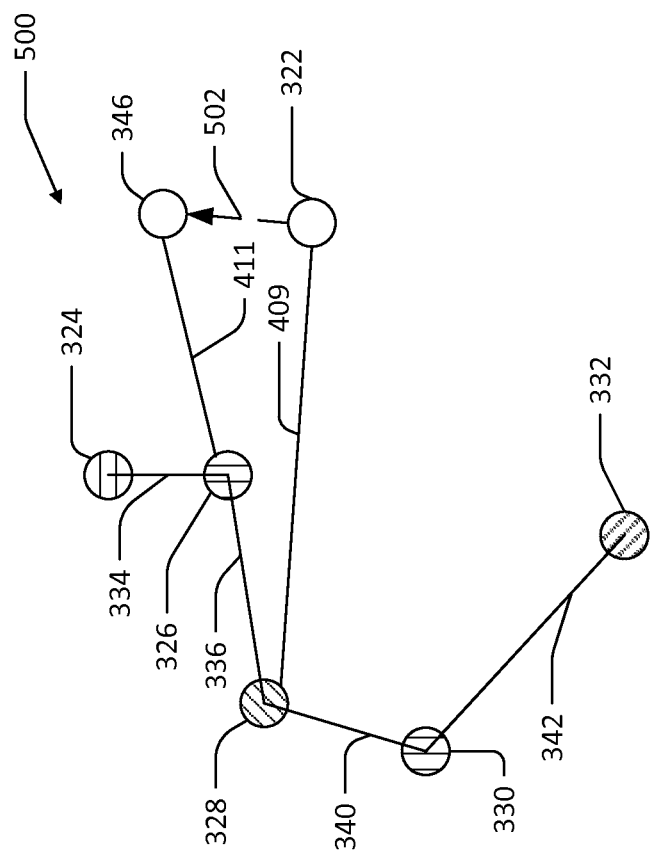
FIG. 5 illustrates an exemplary GST graph.

Now referring to FIG. 5, an exemplary resultant GST graph 500 formed by the GST construction module 118 by merging the layers 408 and 410 is depicted. The GST graph 500 comprises the nodes 322-332 and 346, as well as the undirected edges 334, 336, 340, 342, 409, and 411. The GST graph 500 additionally optionally comprises a directed edge 502 exiting the node 322 and reaching the node 346, indicating a change over time corresponding to the truck(s) 310 and 366 (presuming that it can be discerned that the trucks 310 and 366 are the same). If no presumption is made that the trucks 310 and 366 are the same, then edge 502 would not be included; in either case, however, the nodes 322 and 346 can be assigned the chronology data described above.

In an alternative embodiment, nodes corresponding to observed activity objects may be added to the GST graph directly. For example, node 346 corresponding to truck 366 observed at time 2 might be added directly to the first layer graph 408. In addition, edge 411 might be directly added, yielding the graph 500. This embodiment allows the final graph 500 to be constructed without an intermediate graph 410 and a merging operation.

Figure 6:
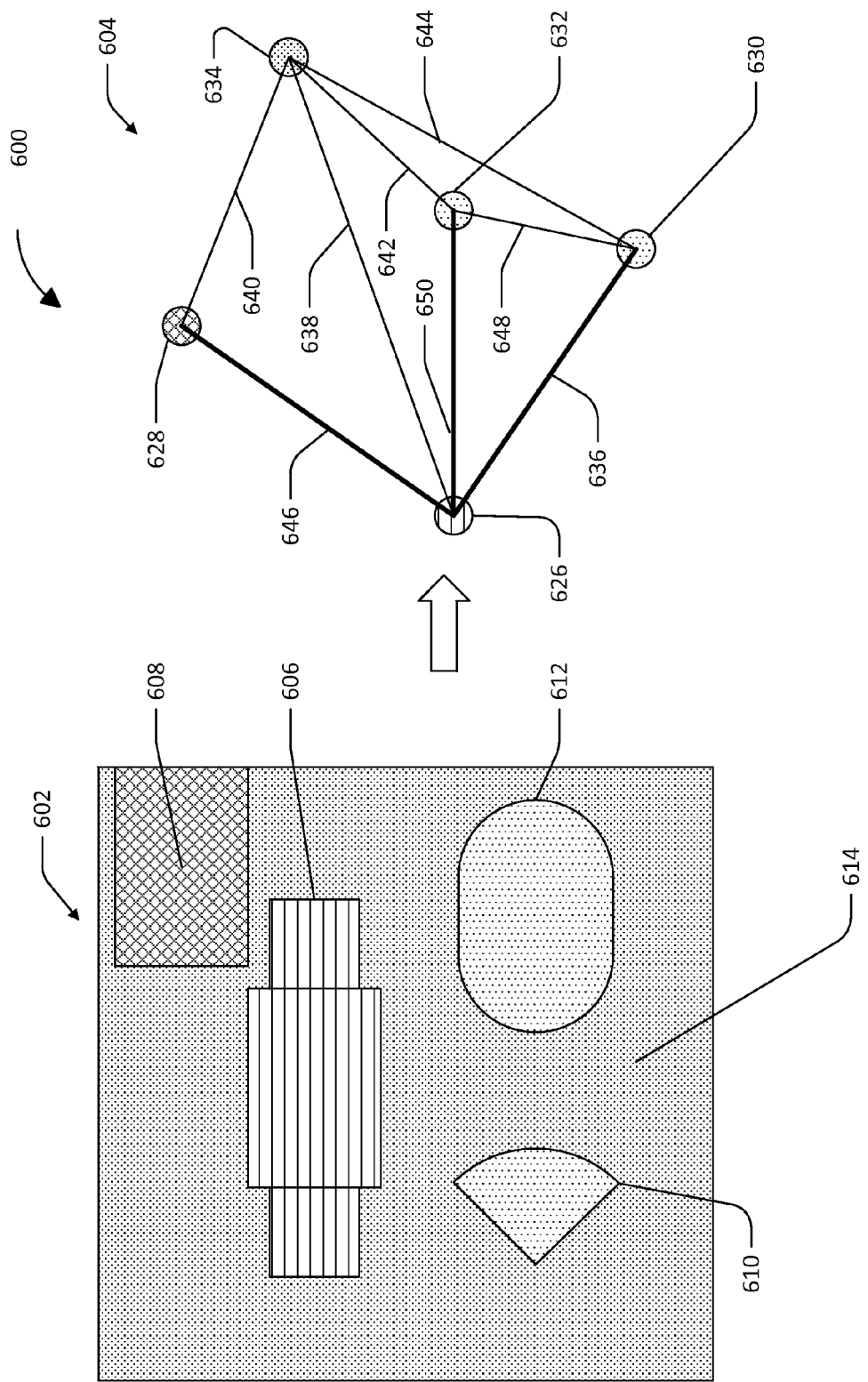
FIG. 6 is an example illustration of a star graph representation of features of interest present in a remote sensing data image.
Figure 7:
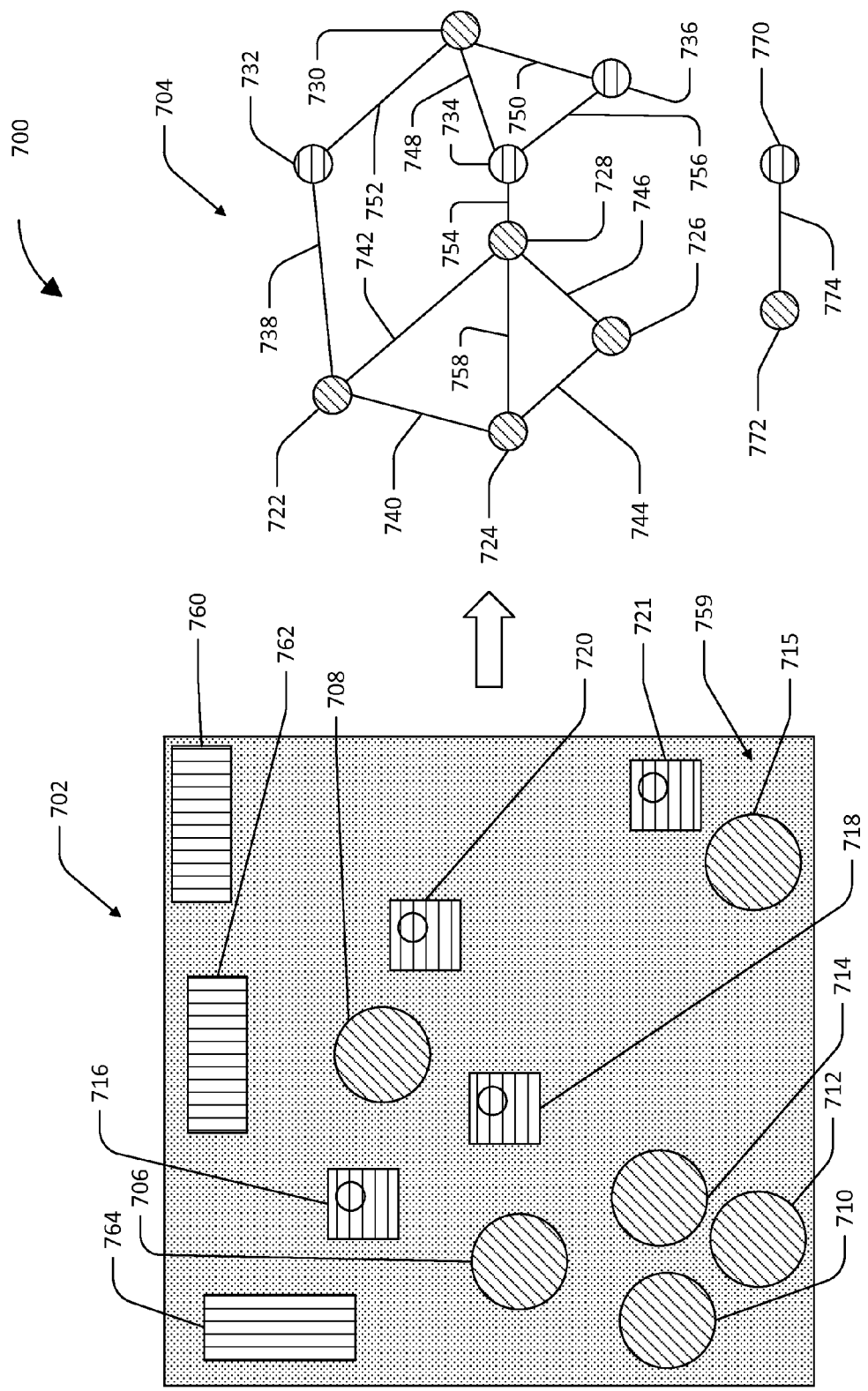
FIG. 7 is an example illustration of a heterogeneous complex search signature present in a remote sensing data image.
Figure 8:
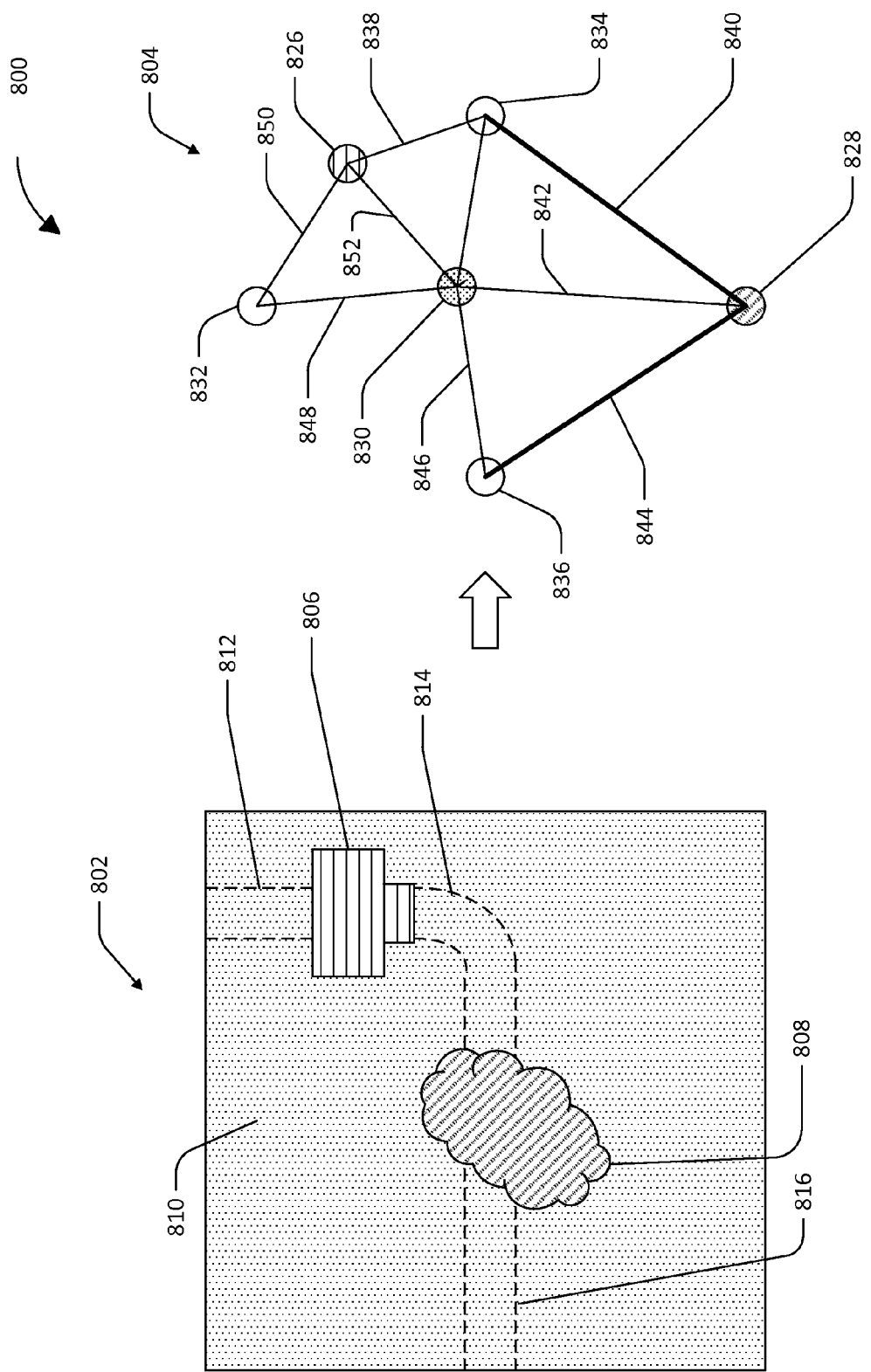
FIG. 8 is an example illustration of an interrupted signature of a vehicle track in a geospatial graph representation of a remote sensing data image.

FIGS. 6-8 illustrate certain common graph patterns arising in graphs representing GST data from remote sensing images that can be used to identify entities of interest. The term "entity" is intended to encompass a single object or a plurality of objects. For example, a college campus can be an entity, and objects in the entity can include a plurality of buildings, parking lots, walkways between buildings, and athletic fields. The above-referenced patterns emerge as a result of the nature of GST data itself, which tends to exhibit these patterns with respect to various types of objects. For example, FIG. 8 illustrates a graph in which interrupted signatures are present as a result of occlusion of one object, a vehicle track 814, 816, by another, in this example a tree 808. The problem of occlusion of features of interest arises frequently in the context of remote sensing data, and graph search methods may be used to ameliorate the problem and preserve the ability to search for occluded objects. The exploitation of GST data patterns in GST graphs allows search algorithms to be more efficient and more broadly applicable than searches based on subgraph isomorphism, which is computationally expensive since it examines the entire GST graph for matches and is inflexible since it requires a precise definition of the subgraph search template. Since GST graphs of wide areas like cities or counties may have millions of nodes and thus millions times millions corresponding potential distance edges, search methods that are more computationally efficient are desirable.

Referring now to FIG. 6, an exemplary illustration 600 of a classification image 602 and its graph representation 604 is shown, in which a star graph search template can be used to identify features (e.g., entities) of interest. A star graph may be used to represent a group of semantically related objects comprising a unifying hub object and one or more optional spoke objects related to that hub. These sorts of groups frequently arise in GST data because semantically-related structures or other objects are often co-located.

The classification image 602 depicts a structure 606, a paved area 608, two fields 610 and 612, and a large surrounding area of vegetation 614. The graph representation 604 of the scene has a node 626 corresponding to the structure 606, a node 628 corresponding to the paved area 608, nodes 630 and 632 corresponding to the two fields 610 and 612, and a node 634 corresponding to the surrounding vegetation 614. The nodes are related by undirected edges 636-650 representing distance and/or adjacency relationships between objects, wherein the inter-object distance satisfies a certain maximum distance threshold between the nodes.

In an example, suppose that this graph representation 604 of the scene is a subgraph of a larger GST graph of a region like a city, and a user wishes to find all high schools within the city. Suppose a high school generally always has a classroom building and an athletic field, and may optionally have a nearby parking lot, some additional number of athletic fields, etc. The school is semantically unified by the classroom building and the other elements making up a school are generally located near that building. The user can thus define a star graph search template for the graph search module 120 with a structure node hub and some number of optional pavement and field nodes as spokes. In the simple illustration example 600 nodes have only a shading attribute corresponding to a particular type of ground cover, but it is to be understood that nodes can be encoded with other attributes defining more specific characteristics of the regions they represent that can also be included in the search template in order to constrain the search. The user also need not identify a specific number of spoke nodes of a given type. Instead, the user may specify a range of acceptable numbers of spokes of a given type, for example $n_{min}=1$, $n_{max}=\infty$ for field-type nodes to represent the athletic fields since there must be at least one but may be more, and $n_{min}=0$, $n_{max}=\infty$ for pavement type nodes to represent the parking lot since it is optional. The search template can also be referred to as the signature of the search object.

Once the search graph template is defined, the graph search module 120 conducts a search over the full GST graph of the search area in question for a subgraph matching the template criteria. The first step entails creating a search graph with just the candidate nodes matching the template criteria. In the high school search example described above, the GST graph of the city being searched may have thousands, or perhaps millions, of nodes. By using the star graph search method, the graph search module 120 can initially limit the scope of the search by restricting its examination of the search graph to candidate nodes matching the hub node type, thereby improving computational efficiency over other techniques like subgraph isomorphism. The operation of the graph search module 120 to construct the search graph is explained in detail in the oil refinery search example explained below; a similar technique would be employed here.

Referring again to FIG. 6, the graph representation 604 contains a match to the example high school search graph template described above. In the example, the node 626 corresponding to the structure region 606 is identified as a hub candidate because it matches the structure node attribute defined for the hub in the example search graph. Adjacency edges 636, 638, 646 and 650 are then constructed for the hub, and the nodes 628-634 on the opposite ends of these edges are compared against the spoke constraints. Nodes not matching the spoke candidate attributes, for example node 634 which is neither a pavement node nor a field node, are eliminated from consideration. The remaining nodes 628-632 are then counted against the $[n_{min}, n_{max}]$ constraints defined by the user in constructing the search template. Since there is one pavement node 628 and two field nodes 630-632 the constraints are met in this example and the resulting star graph is returned as a match. The match result in this example is a high school complex, and is composed of the hub node, 626, the spoke nodes 628-632, and the edges 636, 646, and 650 connecting the spoke nodes to the hub node.

The basic star search graph approach described above can also be extended to search for signatures that do not conform to the star graph framework in their entirety by filtering match results with spoke-to-spoke constraints after the star graph search matches are found. In an example, referring still to FIG. 6, suppose a user wanted to conduct a search for a triangle graph signature wherein a structure and two fields were each within a specified distance of the other two objects. This describes the triangle signature formed by the nodes 626, 630 and 632 and the edges 636, 648, and 650. A search for this subgraph signature can be defined in star graph terms by picking a node type, say the structure type, for the hub node, and defining star graph spoke constraints with $n_{min}=1$ $n_{max}=\infty$ for field nodes. The graph search module 120, applying the star graph search method described above, generates a list of star graph matches including the match depicted in the illustration 600 comprising the hub node 626, spoke nodes 630 and 632, and spoke edges 636 and 650. The list of matches can then be filtered by defining a spoke-to-spoke constraint wherein only star graph matches where an additional edge between the spoke nodes was present would be considered a final triangle signature match. Thus, the triangle signature comprising nodes 626, 630, and 632 and edges 636, 648, and 650 would be returned as a match for the triangle search template by the graph search module 120. This star graph extension retains the advantage of star graph searches in limiting the graph search scope based on hub candidate nodes, while providing added flexibility to the search algorithm.

In addition to signatures involving star graph templates, there are signatures for which no unifying hub may be readily identified. Many of these signatures nevertheless share characteristics that make them susceptible to efficient search. In particular, many signatures of interest are composed of a varying amount of a limited number of objects located close to one another. For example, an oil or other refinery does not have a clearly identifiable unifying hub, but can be generally characterized by having some number of liquid storage tanks and some other number of processing towers in close proximity to one another. No particular tank or processing tower is central, but when a collection of tanks and towers is seen together as a group it is a strong indication of a possible refinery. A heterogeneous complex search method can be used to identify these closely-related collections of objects within graph representations of GST data quickly and efficiently.

Referring now to FIG. 7, an exemplary illustration 700 of a search for an oil refinery is shown. The search criteria for a refinery include a combination of liquid storage tanks and processing towers. FIG. 7 shows a classification image 702 depicting a scene comprising an oil refinery.

In an embodiment, the heterogeneous complex search begins with the graph search module 120 receiving a search definition from a user specifying a collection of an arbitrary number of node types that can participate in the heterogeneous complex signature, the allowable number of nodes [$n_{min}$, $n_{max}$] of each type allowed in a final match, and the conditions required for two nodes to be considered proximal in space and time. In an embodiment, a graph search module 120 can generate a search graph based upon the specified node type constraints and other search criteria, as described with reference to FIG. 1 above. The graph search module 120 can also add edges to the search graph, where each edge satisfies the edge distance and other constraints specified by the template.

FIG. 7 shows the resulting search graph representation 704. The classification image 702 includes six liquid storage tanks 706-715 and four processing towers 716-721. The search graph representation 704 includes nodes 722-730 representing the storage tanks 706-714, nodes 732-736 representing the processing towers 716-720, and undirected edges 738-758 representing distance or adjacency relationships between nodes. The search graph representation 704 also comprises a node 770 that represents the processing tower 721 and a node 772 that represents the liquid storage tank 715, as well as an (undirected) edge 774 that connects the nodes 770 and 772. It can further be noted that the stored graph for this example would include a node for the ground 759 surrounding the towers and tanks and nodes for the other buildings 760-764, but these are not included in the search graph 704 because they are not pertinent to the oil refinery query.

There is another difference between the stored graph and search graph. In the stored graph, node labels match the semantics determined by the image classification module 116. For this example classification image 702, the classification label for scene object 759 could be "ground," and the classification labels for scene objects 706-721 and 760-764 could be "building." Meanwhile, based on selection criteria specified in the search query, the graph search module 120 constructs a search graph with nodes 722-730 and 772 with labels "storage tank" and nodes 732-736 and 770 with labels "processing tower." For purposes of illustration, the shading shown in the classification image 702 of FIG. 7 corresponds with the semantics of the search graph, wherein different types of buildings can be distinguished, but it is to be understood that in generating classification images the classification module 116 would assign the same "building" categorization to each of the image regions 706-721, 760-764.

The graph search module 120 accomplishes the addition of another layer of semantic labelling as described above by evaluating the search criteria specified in the query against individual scene objects, selecting scene objects that match the criteria parameters. For example, the criteria for a liquid storage tank might specify a range of acceptable sizes, and also specify that a storage tank is circular. Similarly, the criteria for a processing tower might specify a different range of acceptable sizes, and further specify a constraint on the minimum acceptable height, which the graph search module 120 evaluates by using the back-pointers in the stored graph to check the height values in the nDSM that was used to construct the stored graph. While not illustrated in this example, the graph search module also may apply geometric transformation operations, such as erosion followed by dilation or separation of path network regions into individual path segments, as part of search graph node construction.

In this way, the graph search module 120 constructs a search graph with nodes labelled "storage tank" and "processing tower" matching the intended search criteria. From that point forward, the search method may proceed without consideration of those criteria parameters. This example illustrates how the graph search module 120 constructs a search graph by transforming the data semantics to the search semantics, evaluating criteria parameters and possibly performing geometric transformations or consulting the raw data for further information. While this has been explained in the context of this specific example of oil refinery search demonstrating the heterogeneous complex search method, it is to be understood that the graph search module 120 can perform similar steps to construct search graph nodes for all of the search methods described herein.

As indicated previously, the graph search module 120 also constructs search graph edges connecting search graph nodes. In this example, the query specifies that storage tanks and processing towers within a single refinery should be separated by no more than 100 yards. The graph search module 120 constructs search graph edges connecting all search graph node pairs that meet this criterion. In general, the graph search module 120 may evaluate a complex combination of constraints, such as, for example, distance, overlap area, relative area, relative direction, whether a change has occurred, relative time constraints, etc, to determine whether to construct a search graph edge between a given pair of search graph nodes, and may apply different constraint criteria to various node types. As with the method for search graph node construction described above, the graph search module 120 can perform similar steps to construct search graph edges for all of the search methods described herein.

In the search graph 704, no particular hub node is unifying in the graph representation 704, thus frustrating the star graph search method. The heterogeneous complex search method can be used to identify the portion of graph 704 which corresponds to the refinery, namely nodes 722-736 and edges 738-758.

The search graph can then be examined by starting with nodes of a designated seed node type, which can be any type for which $n_{min}$>0, and constructing connected components. The graph search module 120 then checks the connected components against the node number constraints and returns the signatures satisfying these constraints as matches, which may be presented to a user on a display 110 as graph search results 126.

Referring again to FIG. 7, a user might specify that a candidate oil refinery should contain [5, ∞] storage tanks and [2, ∞] processing towers. In an embodiment, the graph search module 120 then identifies a search graph node, say node 734, to serve as a seed node. In this particular example any node may be used because the $n_{min}$ constraint for each node type is greater than zero. Starting at node 734 the graph search module 120 identifies nodes 728, 730, and 736 as connected to node 734 by an edge, because of the existence of search graph edges 754, 748, and 756. This process is then repeated for nodes 728, 730, and 736, finding all nodes they are connected to which have not yet been found (in this case nodes 722, 724, 726, and 732). This neighbor exploration process is then repeated until no new additional connected nodes are found. The collection of all nodes connected to seed node 734 is then a connected component found by the method, which is added to the match result list. If there are additional search graph nodes not contained within a connected component already found, then a new seed node is selected from among the remaining nodes and the process is repeated, resulting in a new connected component which is added to the match result list. In the example illustration 700, for example, where the liquid storage tank 715 and the processing tower 721 are represented by nodes 772 and 770 respectively, nodes 770 and 772 comprise an additional connected component linked by edge 774. This process is repeated until all search graph nodes are accounted for within a found connected component. In the example shown in FIG. 7, there are two connected components, and thus two entries in the match result list.

Each connected component in the match result list is then compared against the node number constraints of the oil refinery search problem. In the example shown in FIG. 7, the connected component including nodes 722-736 has five storage tank nodes, satisfying the [5, ∞] constraint for that type, and three processing tower nodes, satisfying the [2, ∞] constraint for that type. Thus this connected component can then be returned to the user as a graph search result 126 of a search query match candidate, which can include pointers back to the original source data to facilitate user interpretation of the candidate match. The connected component including nodes 770-772, on the other hand, fails to satisfy the node number constraints, and is therefore not returned to the user as a graph search result 126.

Also common in remote sensing image data are sensor noise or other obstructions that disconnect what would otherwise be contiguous regions or objects in classification images and GST graph representations. These obstructions interfere with search algorithms like the star graph search method described above by, for example, disconnecting candidate spoke nodes from hub nodes. FIG. 8 illustrates an example of signature obstruction in a classification image 802 based on remote sensing data and the resulting effect on the GST graph representation 804 of the scene. In the classification image 802, there is a building 806 and a tree 808 in a field 810 in which there are also three vehicle tracks 812-816. The GST graph representation 804 of the scene has a node 826 corresponding to the building 806, a node 828 corresponding to the tree 808, a node 830 corresponding to the field 810, a node 832 corresponding to the first vehicle track 812, a node 834 corresponding to the second vehicle track 814, and a node 836 corresponding to the third vehicle track 816, as well as undirected edges 838-852 corresponding to adjacency or distance relationships between connected nodes. An analyst examining the classification image 802 might surmise that the vehicle tracks 814 and 816 are in fact a single continuous track, and that the continuation of the track is simply blocked from view by the tree 808 that a vehicle may have passed under. This possibility is not immediately apparent from the graph, however, because the graph representation 804 has represented these tracks by two separate nodes that, so far as can be told from the classification image 802, are not very close to one another.

Recovering the possibility that tracks 814 and 816 are in fact the same signature that is simply interrupted by an obstruction preserves the robustness of the graph search method for remote sensing image data against sensor imperfections and object occlusions. This may be accomplished by defining permissible signature interrupt node characteristics. In an example, a vehicle track may be a signature of interest and trees may be defined as permissible vehicle track signature interrupt nodes. Thus, in the graph representation 804, the vehicle track nodes 834 and 836 may be identified as belonging to a single vehicle track signature with 828 as a signature interrupt node, the full vehicle signature consisting of the node 836, undirected edge 844, node 828, undirected edge 840, and node 834. This approach permits the graph search module 120 to identify this interrupted signature as representing a single vehicle track, while simultaneously rejecting the unlikely possibility that the vehicle track 812 also belongs to the signature, since buildings were not defined as permissible vehicle track interrupt nodes. It is to be understood that these signature interrupt permissions can be defined on a search-by-search basis, or can be implemented as default parameters within a GST graph search system.

Figure 9:
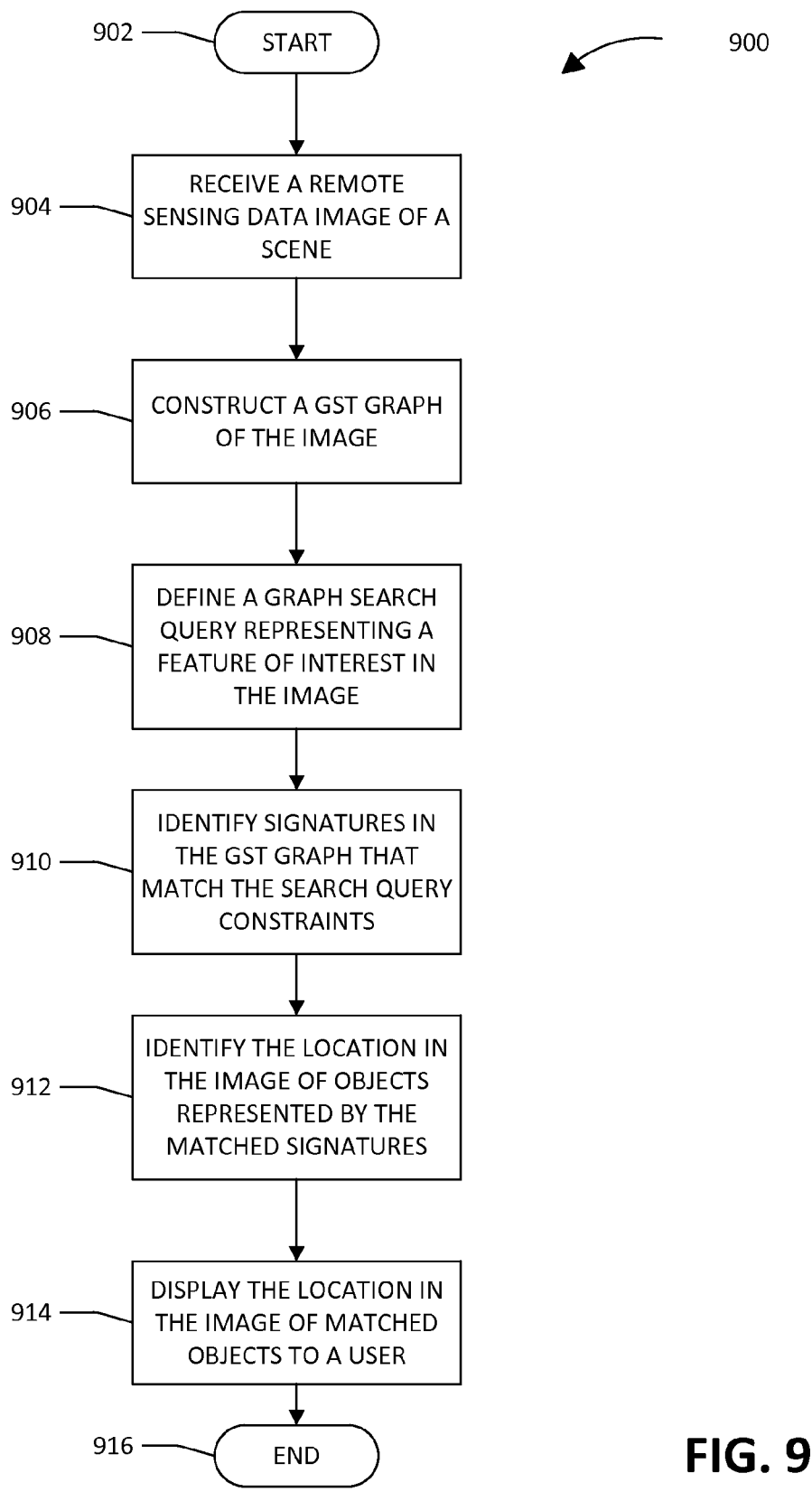
FIG. 9 is a flow diagram that illustrates an exemplary methodology for finding and displaying features of interest in an image.

FIG. 9 illustrates an exemplary methodology relating to searching GST graphs. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 9 illustrates a methodology 900 that facilitates the presentation of the results of searches over GST graphs using pointers to source image data 104 is illustrated. The methodology 900 begins at 902, and at 904 a remote sensing data image is received. The remote sensing data image can be an RGB+IR image of a scene, a SAR image, or any other type of remote sensing image that is suitable for analysis to distinguish between different types of ground cover objects. It is to be understood that the remote sensing data image may comprise multiple images of the same scene separated in time. A GST graph of the remote sensing image is then constructed at 906 including an image classification step, and includes nodes representing objects depicted in the scene, undirected and directed edges can represent distance, adjacency, temporal, change, and other relations between nodes across two or more remote sensing images.

At 908, a graph search query is defined corresponding to an object of interest in the remote sensing data image. In an embodiment, node and edge constraints of signature matches can be determined directly by a user. In an alternative embodiment, the user can define a search query at a high level, for example "search for schools," whereupon a computing device or other system that facilitates searches over GST graphs may refer to a pre-defined library of search terms to identify node and edge constraints of signatures corresponding to the high-level search object. At 910, signatures matching these search query constraints are identified in the GST graph. At 912, pointers back to the original remote sensing image data are used to identify the location in the remote sensing images of objects represented by matched signatures. This is accomplished by including pointers to the data as attributes of the nodes themselves when the graph is constructed. Thus, the nodes of the subgraph comprising the matched signature already contain the necessary data to identify the location of the matched signature in the image. Once the locations of matched signatures have been identified, they are presented to the user on a display device or by other means at 914. The methodology 900 ends at 916.

Figure 10:
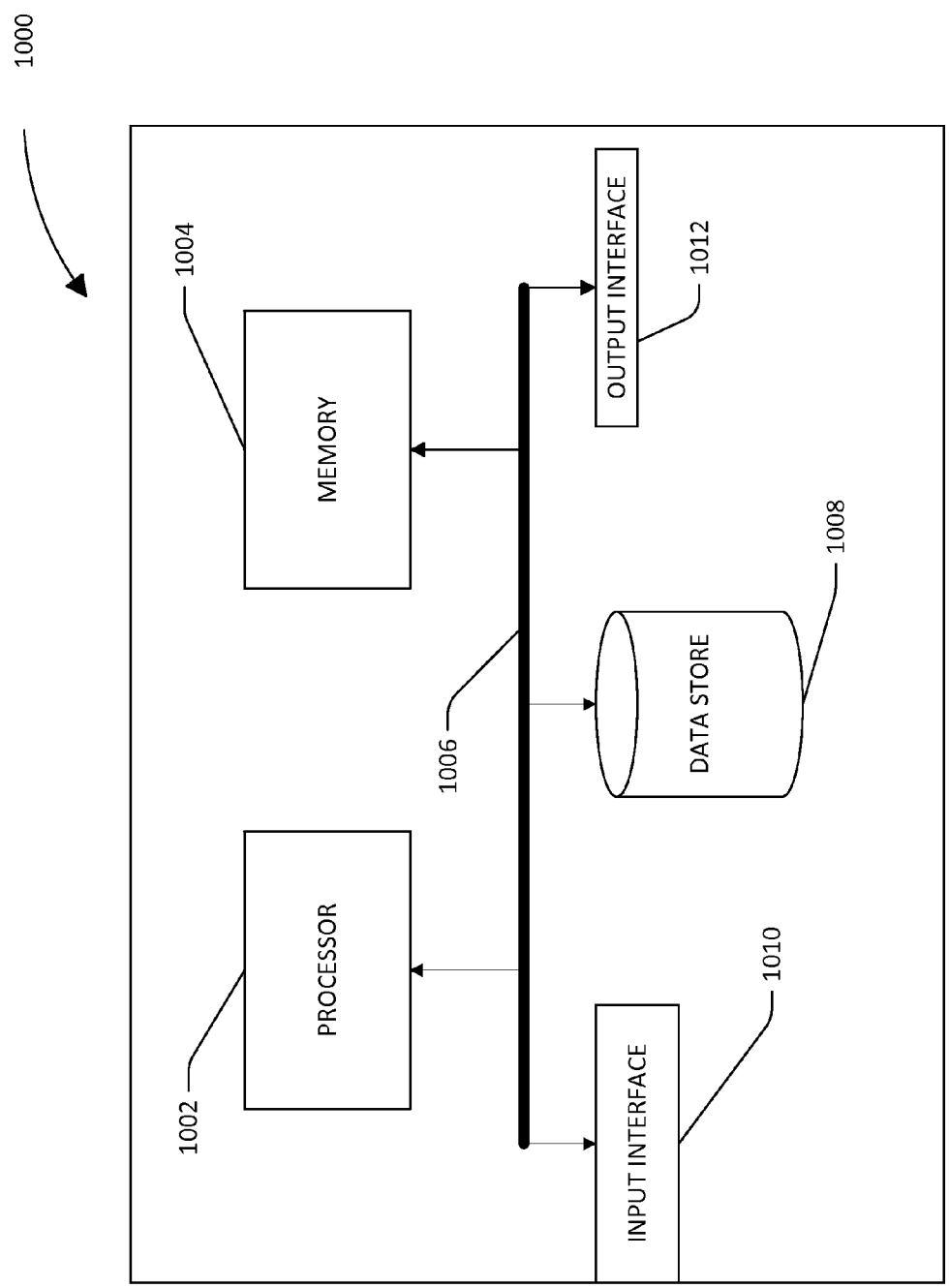
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that performs user-defined searches over GST graphs of remote sensing images. By way of another example, the computing device 1000 can be used in a system that displays GST graph search results to a user and allows the user to provide interpretive feedback about the results. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store source images 104, classification images, GST graphs, etc.

The computing device 1000 additionally includes a data store 1008 that is accessible by the processor 1002 by way of the system bus 1006. The data store 1008 may include executable instructions, source images 104, classification images, GST graphs etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include code-writing user interfaces, graphical user interfaces, natural user interfaces, and so forth. For instance, a code-writing user interface typically includes a means of writing compute program code to instruct the system to perform desired steps. A graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
   a processor; and
   memory that comprises instructions that, when executed by the processor, cause the processor to perform acts comprising:

responsive to receiving a search query pertaining to an activity of interest in a scene, performing a search over a geospatial temporal (GST) graph for the activity in the scene, wherein the GST graph comprises:
  nodes that represent objects captured in a remote sensing image in the scene, wherein a first node in the nodes is assigned data indicating that the first node represents an object that is expected to change position over time; and
  undirected edges, wherein each undirected edge in the undirected edges couples a respective pair of nodes in the nodes, the undirected edge is assigned data that is indicative of a symmetric relationship between objects in the scene represented by nodes in the pair of nodes;
identifying a location of the activity in the scene based upon the search of the GST graph; and
outputting graphical data to a display indicating the location of activity in the scene.

2. The computing device of claim 1, wherein performing the search over the GST graph comprises performing a star graph search over the GST graph for the activity in the scene.

3. The computing device of claim 2, wherein performing the star graph search over the GST graph comprises performing the star graph search based upon a star graph search template, the star graph search template comprises:
  a hub that identifies a type of object included a signature indicative of the activity; and
  a spoke that identifies a second type of object included in the signature and further identifies a relationship between the hub and the spoke.

4. The computing device of claim 3, the star graph search template further comprises a plurality of spokes, each spoke identifies a respective type of object included in the signature and further identifies a relationship between the hub and each spoke.

5. The computing device of claim 4, wherein at least one spoke in the plurality of spokes is identified as being of a type of object that is optionally included in the signature.

6. The computing device of claim 3, the star graph search template further comprises a signature interrupt node, the signature interrupt node comprises a characteristic that is indicative of an acceptable interrupt between two nodes to allow for inferring that the nodes are representative of a single object.

7. The computing device of claim 3, wherein performing the star graph search over the GST graph further comprises searching the GST graph for a subgraph that conforms to the star graph search template.

8. The computing device of claim 2, wherein performing the search over the GST graph further comprises:
  returning a plurality of search results based upon the star graph search, the plurality of search results comprising a sub-graph; and
  responsive to returning the plurality of search results, filtering the sub-graph from the plurality of search results based upon a constraint assigned between spokes of the sub-graph.

9. The computing device of claim 1, wherein performing the search over the GST graph comprises performing a heterogeneous complex search over the GST graph.

10. The computing device of claim 9, wherein performing the heterogeneous complex search over the GST graph comprises:
  executing a search over the GST graph based upon a heterogeneous complex signature, the heterogeneous complex signature comprises:
    an identity of a first object type;
    an identity of a second object type; and
    a constraint pertaining to a relationship between an object of the first object type and an object of the second object type.

11. The computing device of claim 10, wherein the constraint pertaining to the relationship between the object of the first object type and the object of the second object type is at least one of:
  a symmetric relationship constraint that constrains an acceptable symmetric relationship between the object of the first object type and the object of the second object type; or
  an asymmetric relationship constraint that constrains an acceptable asymmetric relationship between the object of the first object type and the object of the second object type.

12. A method executed by a computer processor, the method comprising:
  receiving a geospatial graph that is representative of objects in a scene depicted in a remote sensing image, the graph comprising:
    nodes that represent objects captured in the remote sensing image, wherein each node is assigned data that indicates that the node is of a respective object type, wherein a first node in the nodes is assigned data that indicates that the first node represents a vehicle; and
    undirected edges, wherein each undirected edge in the undirected edges couples a respective pair of nodes in the nodes, each undirected edge is assigned data that is indicative of a symmetric relationship between objects in the scene represented by nodes in the pair of nodes;
  receiving a query, the query comprises data that is indicative of an acceptable structure of sub-graphs in the geospatial graph;
  performing at least one of a star graph search or a heterogeneous complex search over the geospatial graph based upon the query to identify a sub-graph that conforms to the acceptable structure of sub-graphs, wherein the sub-graph comprises the first node; and
  outputting graphical data to a display based upon the sub-graph.

13. The method of claim 12, wherein the query comprises:
  a hub that identifies a first object type;
  a spoke that identifies a second object type; and
  constraint data that defines a constraint between the hub and the spoke.

14. The method of claim 13, wherein the constraint data defines an acceptable distance range between an object of the first object type and an object of the second object type.

15. The method of claim 13, wherein the query further comprises at least one additional spoke, the at least one additional spoke identified as being optionally included in the sub-graph.

16. The method of claim 12, wherein the geospatial graph has temporal features encoded therein, and wherein the query is configured to identify an activity represented in the geospatial graph, the activity being movement of the vehicle.

17. The method of claim 12, wherein the query is configured in connection with performing the heterogeneous complex search.

18. A computer-readable storage medium comprising instructions that, when executed by a processor, cause the processor to perform acts comprising:

executing a graph search over a geospatial temporal (GST) graph, the GST graph representative of objects in a scene including an object associated with activity in the scene, symmetric relationships between the objects in the scene, and asymmetric relationships between the objects in the scene, wherein the GST graph comprises a first node representative of a first object in the scene, the first node assigned data indicating that the first node represents an object that is expected to change position over time, wherein executing the graph search comprises identifying a sub-graph in the GST graph that corresponds to a sub-graph structure set forth in a query, the sub-graph structure comprising at least one of a star graph structure or a heterogeneous complex structure; and outputting graphical data that is based upon the identified sub-graph in the GST graph.

19. The computing device of claim 1, wherein the first node is assigned data indicating that the first node represents a vehicle.

20. The computing device of claim 18, wherein the object associated with activity is a vehicle.

\* \* \* \* \*